United States Patent
Tsujita et al.

(10) Patent No.: US 6,965,306 B2
(45) Date of Patent: Nov. 15, 2005

(54) TIRE CONDITION MONITORING APPARATUS

(75) Inventors: Yasuhisa Tsujita, Ogaki (JP); Michiya Katou, Ogaki (JP)

(73) Assignee: Pacific Industrial Co., Ltd., Gifu-Ken (JP)

( * ) Notice: Subject to any disclaimer, the term of this patent is extended or adjusted under 35 U.S.C. 154(b) by 120 days.

(21) Appl. No.: 09/905,317

(22) Filed: Jul. 13, 2001

(65) Prior Publication Data
US 2002/0167400 A1 Nov. 14, 2002

(30) Foreign Application Priority Data
May 10, 2001 (JP) ............................... 2001-140551

(51) Int. Cl.$^7$ ............................................. B60C 23/00
(52) U.S. Cl. .................... 340/448; 340/443; 340/636; 340/445; 340/10.1; 73/146.5; 73/49
(58) Field of Search ................................ 340/443, 442, 340/636, 539, 447, 522, 449, 10.1, 438, 444, 340/445; 73/146.5, 49, 146.8

(56) References Cited
U.S. PATENT DOCUMENTS

| | | | |
|---|---|---|---|
| 5,335,540 A * | 8/1994 | Bowler et al. ............ 73/146.5 |
| 5,573,611 A * | 11/1996 | Koch et al. ............... 340/447 |
| 5,783,992 A * | 7/1998 | Eberwine et al. .......... 340/445 |
| 6,232,875 B1 * | 5/2001 | Dezorzi .................... 340/442 |
| 6,252,498 B1 * | 6/2001 | Pashayan, Jr. ............. 340/447 |
| 6,271,748 B1 * | 8/2001 | Derbyshire et al. ........ 340/442 |
| 6,340,930 B1 * | 1/2002 | Lin ........................ 340/447 |
| 6,445,286 B1 * | 9/2002 | Kessler et al. ............ 340/442 |
| 6,580,364 B1 * | 6/2003 | Munch et al. ............. 340/447 |

\* cited by examiner

Primary Examiner—Jeffery Hofsass
Assistant Examiner—Daniel Previl
(74) Attorney, Agent, or Firm—Fish & Richardson P.C.

(57) ABSTRACT

A transmitter, which is operated by a battery, wirelessly transmits data including data that represents the temperature T in a tire and data that represents the voltage V of the battery. A receiver judges whether or not the life of the battery is ending depending on the battery voltage V read from the received data. More specifically, the receiver performs the judgment regarding the life of the battery based on a comparison between the battery voltage V and a variable voltage reference value V0, which is selected in accordance with the temperature T in the tire. The judgment regarding the life of the battery is thus accurately performed.

15 Claims, 5 Drawing Sheets

TIRE CONDITION MONITORING APPARATUS

BACKGROUND OF THE INVENTION

The present invention relates to apparatuses for monitoring the condition of a tire attached to a vehicle, and, more particularly, to techniques for judging the condition of a battery installed in a transmitter that is attached to a tire.

Conventionally, a wireless, tire condition monitoring apparatus informs a driver of the condition of each tire attached to a vehicle through an indicator located in a passenger compartment. A transmitter is attached to each tire. The transmitter measures the pressure and temperature in the associated tire and wirelessly transmits data representing the measurements. A receiver is located in the vehicle's body frame and receives the data from the transmitter. The receiver obtains necessary information from the data and instructs the indicator to indicate the information as needed.

Since each transmitter is powered by a battery, the transmitter stops operating if the associated battery's life ends. Thus, when the battery's life is ending, the driver needs to be informed of the condition of the battery through the indicator, which is located in the passenger compartment. Accordingly, the conventional monitoring apparatus transmits data representing the voltage of each battery, together with the data representing the condition of each tire. If the voltage of the battery is equal to or smaller than a predetermined reference value, the receiver judges that the life of the battery is ending. The receiver then instructs, for example, the indicator to indicate the judgment.

However, the battery voltage is affected by the ambient temperature to which the battery is exposed. That is, the lower the ambient temperature is, the lower the battery voltage is. Particularly, the temperature variation in the tire in which the battery is located is relatively large. Thus, the condition of the battery cannot be accurately judged if the judgment is based on only the comparison between the battery voltage and the reference value. In other words, if the judgment is based only on such a comparison, the condition of the battery may be erroneously judged.

BRIEF SUMMARY OF THE INVENTION

Accordingly, it is an objective of the present invention to provide a tire condition monitoring apparatus that accurately judges the condition of a transmitter battery.

To achieve the foregoing and other objectives and in accordance with the purpose of the present invention, the invention provides a tire condition monitoring apparatus for monitoring a condition of a tire attached to a vehicle. The apparatus includes a transmitter and a controller. The transmitter is operated by a battery and detects at least the temperature in the tire and a voltage-related value that varies in accordance with voltage of the battery. The controller judges whether or not the life of the battery is ending depending on the voltage-related value. The judgment regarding the life of the battery is performed in accordance with the temperature in the tire.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
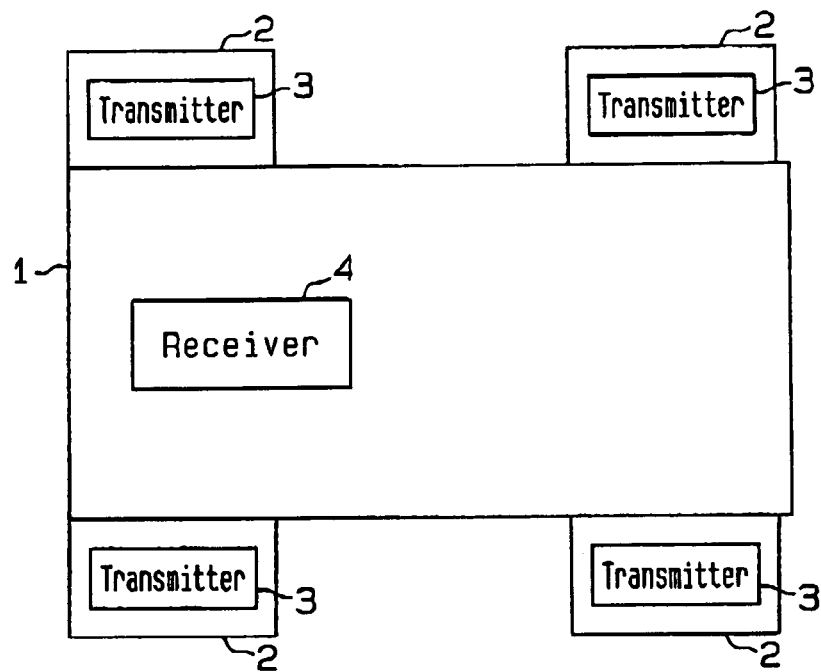
FIG. 1 is a view schematically showing a first embodiment of a tire condition monitoring apparatus according to the present invention.

A first embodiment of the present invention will now be described with reference to FIGS. 1 to 6. As shown in FIG. 1, a tire condition monitoring apparatus includes four transmitters 3 and a receiver 4. Each transmitter 3 corresponds to a tire 2 of a vehicle 1, and the receiver 4 is installed in the body frame of the vehicle 1. More specifically, each transmitter 3 is secured to a wheel to which the corresponding tire 2 is attached such that the transmitter 3 is located in the tire 2. The transmitter 3 measures the pressure and temperature in the tire 2 and wirelessly transmits data representing the measurements to the receiver 4.

Figure 2:
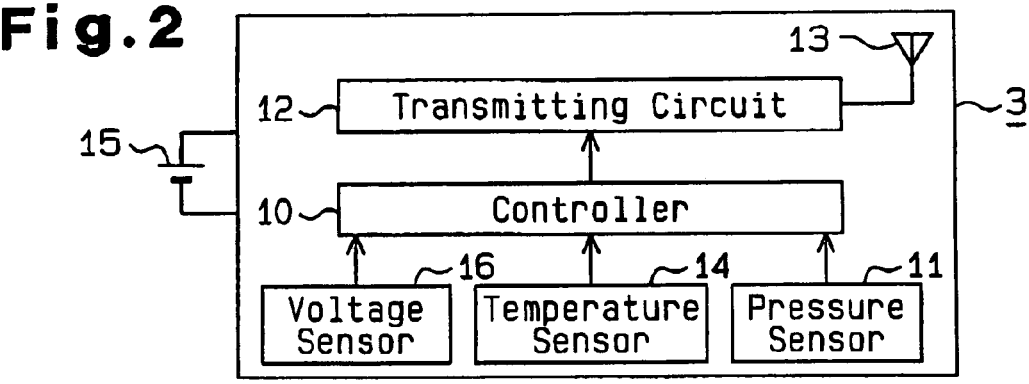
FIG. 2 is a block diagram showing a transmitter of the apparatus of FIG. 1.

As shown in FIG. 2, each transmitter 3 includes a controller 10, which is, for example, a microcomputer. The controller includes, for example, a central processing unit (CPU), a random access memory (RAM), and read only memory (ROM). The controller 10 stores specific identification codes and identifies the four transmitters 3 that are installed in the vehicle 1 in accordance with the associated identification codes.

A pressure sensor 11 measures the pressure in the tire 2 and outputs pressure data that represents the measurement to the controller 1. A temperature sensor 14 measures the temperature in the tire 2 and outputs temperature data that represents the measurement to the controller 10.

A battery 15 supplies power to each transmitter 3. A voltage sensor 16 measures voltage of the battery 15 and outputs voltage data that represents the measurement to the controller 10.

The controller 10 transmits data that includes the pressure data, the temperature data, the voltage data, and an identification code to a transmitting circuit 12. The transmitting circuit 12 encodes and modulates the data received from the controller 10. The data is then wirelessly transmitted through a transmitting antenna 13.

The controller 10 instructs the pressure sensor 11, the temperature sensor 14, and the voltage sensor 16 to perform measurements every predetermined time interval (for example, every fifteen seconds). Further, the controller 10 instructs the transmitting circuit 12 to perform a periodic transmission every time the pressure sensor 11 completes a predetermined number of measurement cycles (for example, forty cycles). When detecting an abnormal pressure or temperature of the associated tire 2, the controller 10 instructs the transmitting circuit 12 to transmit data, regardless of whether or not the pressure sensor 11 has completed the predetermined number of measurement cycles.

Figure 3:
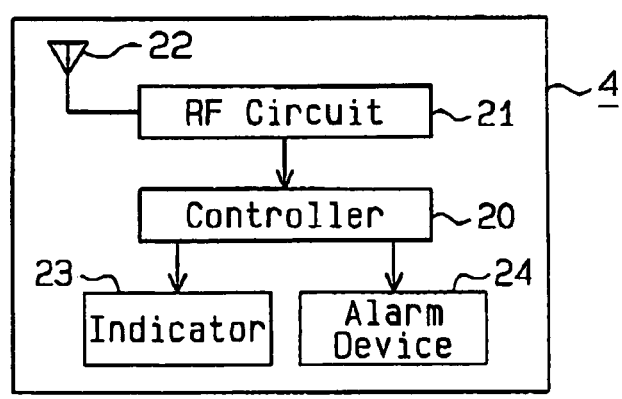
FIG. 3 is a block diagram showing a receiver of the apparatus of FIG. 1.

As shown in FIG. 3, the receiver 4 is powered by a battery (not shown) installed in the vehicle 1 when a key switch (not shown) of the vehicle 1, for example, is turned on. The receiver 4 includes a controller 20, which is, for example, a microcomputer. The controller 20 functions as a battery life judging means and includes, for example, a CPU, an RAM, and an ROM.

An RF circuit 21 receives data from each transmitter 3 through at least one transmitting antenna 22. The RF circuit 21 demodulates and decodes the data and then sends the data to the controller 20. The controller 20 then reads the pressure and temperature in the associated tire 2 from the data and judges whether or not the life of the associated battery 15 is ending.

The controller 20 instructs an indicator 23 to indicate information regarding the temperature and pressure in each tire 2 and information regarding the life of the associated battery 15. The indicator 23 is located to be viewed easily by the driver of the vehicle 1. Further, when detecting an abnormal temperature or pressure in one tire 2, the controller instructs an alarm device 24 to inform the driver of the abnormality. The alarm device 24 is, for example, an audio device that produces an alarm sound or an illuminating device that emits an alarm light. Alternatively, the indicator 23 may indicate the abnormal pressure or temperature of the tire 3.

Next, a battery life judging process performed by the controller 20 will be described with reference to FIG. 6. The flowchart of FIG. 6 indicates a routine of the battery life judging process. The routine is repeated, for example, every time the receiver 4 receives data from one transmitter 3. Further, the routine is performed independently for each transmitter 3 of the vehicle 1. The data transmitted from the transmitter 3 includes its specific identification code. Thus, when the controller 20 receives data from one transmitter 3, the controller identifies the transmitter 3 in accordance with the identification code.

Subsequently, in step S1, the controller 20 reads the temperature T in the tire 2 associated with the transmitter 3, from which the controller 20 has received the data, and the voltage V of the associated battery 15 from the received data.

In step S2, the controller 20 computes a voltage reference value V0 in relation to the temperature T using the following equation (1). Whether or not the life of the battery 15 is ending is judged with reference to the voltage reference value V0. The numerals a, b in the equation (1) are predetermined constants that are selected depending on which type the battery 15 is.

$$V0 = aT + b \quad \text{Equation (1)}$$

Figure 4:
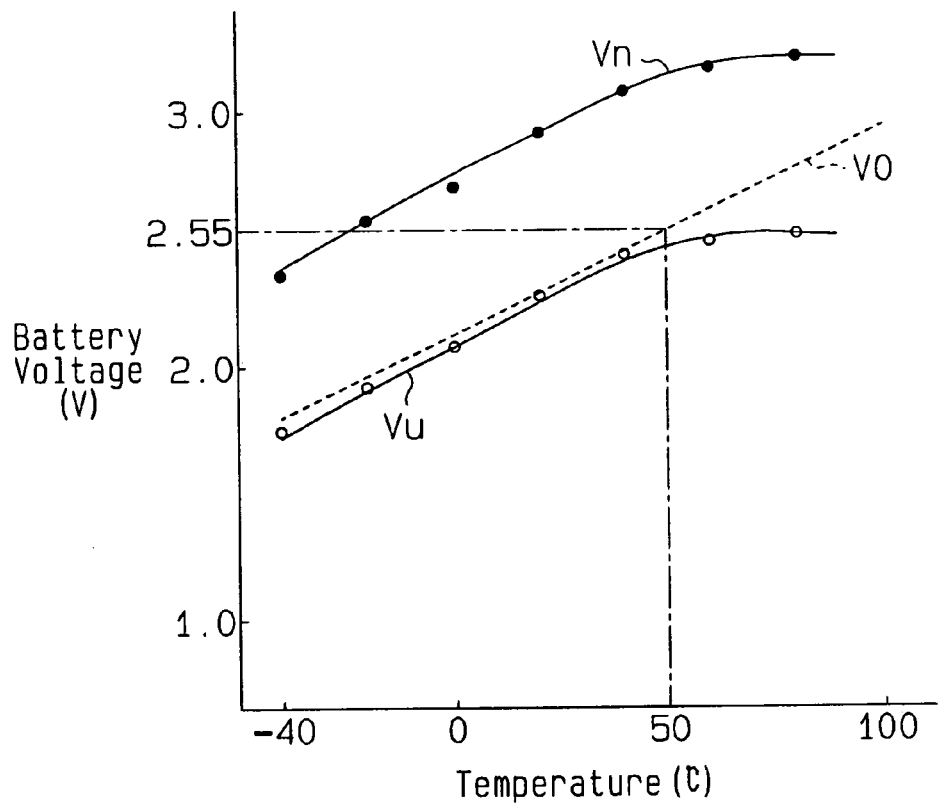
FIG. 4 is a graph representing the relationship between battery voltage and ambient temperature.
Figure 5:
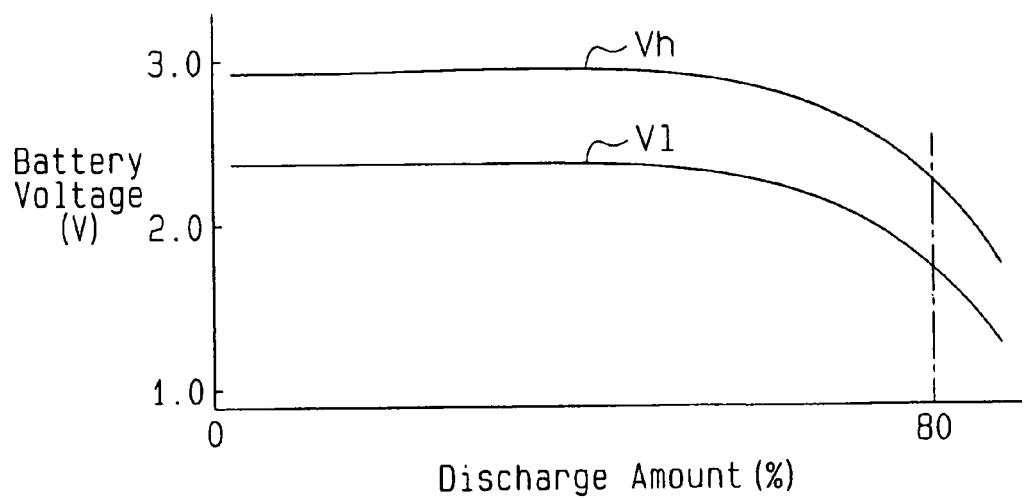
FIG. 5 is a graph representing the relationship between battery voltage and battery discharge level.

FIG. 4 is a graph showing the relationship between the ambient temperature and the voltage of the battery 15. In the graph, the curve Vn represents voltage variation of the battery 15 in a fully charged state. The curve Vu represents voltage variation of the battery 15 in an 80% discharged state. FIG. 5 is a graph showing the relationship between the discharge level of the battery 15 and the voltage of the battery 15. In the graph, the curve Vh represents voltage variation of the battery 15 when the ambient temperature is twenty degrees Celsius. The curve Vl represents voltage variation of the battery 15 when the ambient temperature is −40 degrees Celsius. The graphs of FIGS. 4 and 5 were obtained based on test results.

As is clear from the graphs of FIGS. 4 and 5, as the discharge level of the battery 15 increases, the voltage of the battery 15 decreases. Further, as the ambient temperature to which the battery 15 is exposed decreases, the voltage of the battery 15 decreases. The constants a, b of the equation (1) are selected in accordance with characteristics of the battery 15, which are indicated by the graphs of FIGS. 4 and 5. For example, the constants a, b are selected such that the voltage reference value V0 corresponds to the broken straight line of FIG. 4. The broken line is an approximation of the curve Vu, which represents the voltage variation of the battery 15 in the 80% discharged state. In other words, the linear function represented by the equation (1), by which the voltage reference value V0 is determined, is an approximation of the curve Vu. In accordance with the graph of FIG. 4, the voltage reference value V0 is selected to be 2.55 volts when the ambient temperature to which the battery 15 is exposed, or the temperature T in the tire 2, is 50 degrees Celsius.

Figure 6:
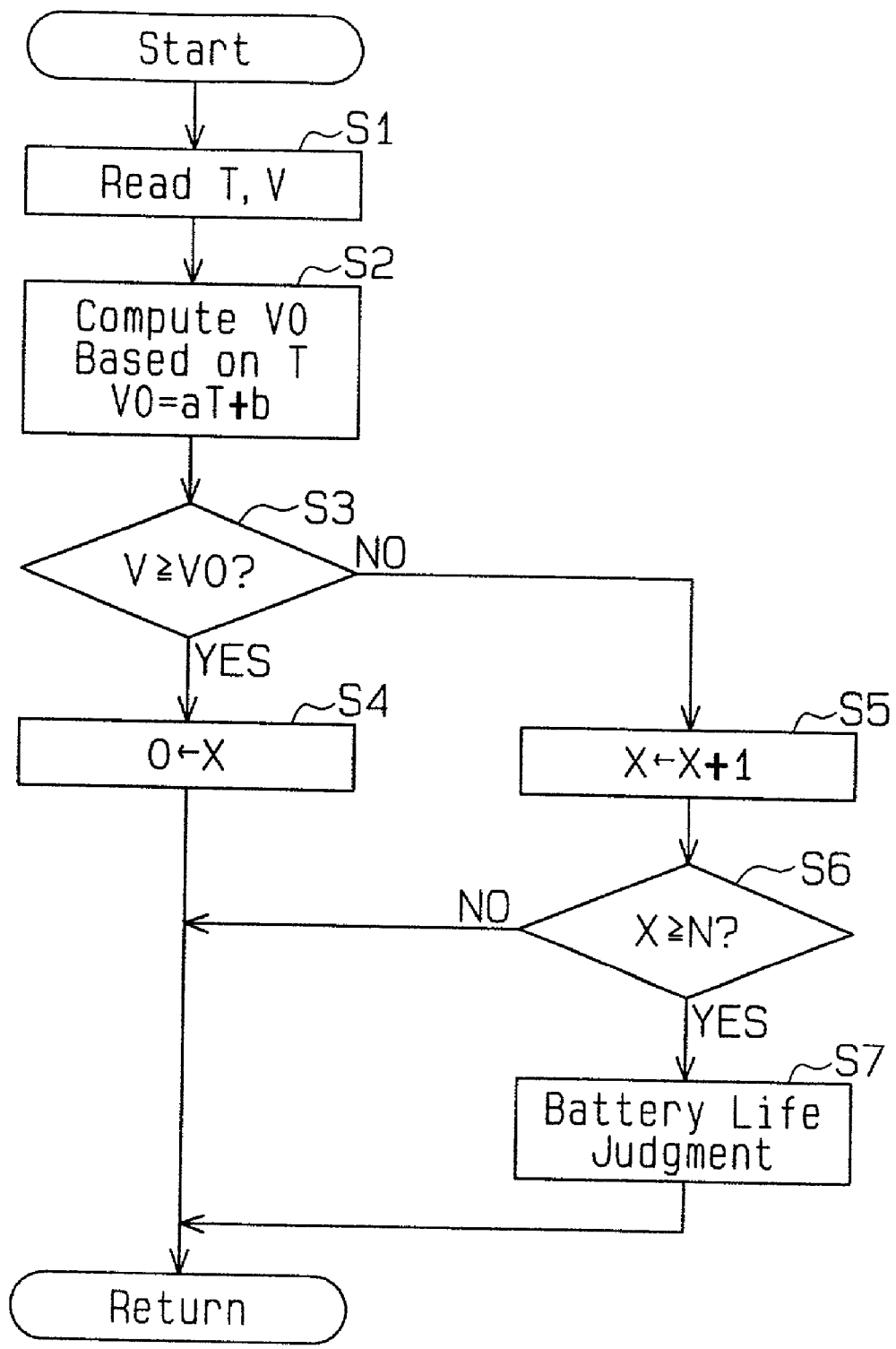
FIG. 6 is a flowchart showing a battery life judging process of the first embodiment.

After completing step S2, the controller 20 proceeds to step S3, as shown in FIG. 6. More specifically, the controller 20 judges whether or not the voltage V is equal to or greater than the voltage reference value V0. If the voltage V is equal to or greater than the voltage reference value V0, the controller 20 determines that the life of the battery 15 is not ending yet. The controller 20 then proceeds to step S4. In step S4, the controller 20 resets the counter number X to zero, thus discontinuing the process.

In contrast, if the voltage V is smaller than the voltage reference value V0, the controller 20 performs step S5. In step S5, the controller 20 adds one to the current counter number X, thus obtaining a new counter number X.

Next, in step S6, the controller 20 judges whether or not the counter number X is equal to or greater than a predetermined number N. The predetermined number N is selected to be an integer that is not smaller than one, which is, for example, three. If the counter number X is smaller than the predetermined number N, the controller 20 discontinues the process. However, if the counter number X is equal to or greater than the predetermined number N, it is indicated that the voltage V of the battery 15 has been repeatedly judged to be smaller than the voltage reference value V0 in consecutive judgment cycles corresponding to the counter number X. In this case, the controller 20 proceeds to step S7.

In step S7, the controller 20 determines that the life of the battery 15 is ending. The controller 20 then instructs, for example, the indicator 23 or the alarm device 24 to inform the driver that the life of the battery 15 is ending. Afterward, the controller 20 discontinues the process.

As described, in the first embodiment, whether or not the life of the battery 15 is ending is judged based on comparison between the voltage V of the battery 15 and the voltage reference value V0. The voltage reference value V0 is varied in accordance with the temperature T in the tire 2 in which the battery 15 is located. Thus, it is accurately judged whether or not the life of the battery 15 is ending, regardless of the ambient temperature to which the battery 15 is exposed.

The equation (1), which determines the voltage reference value V0, is selected considering characteristics of the actual voltage variation of the battery 15 with respect to the ambient temperature. Accordingly, the voltage reference value V0 constantly reflects the actual voltage variation of the battery 15 that is attached to the associated transmitter 3.

The equation (1) reflects the voltage variation of the battery 15 in the 80% discharged state with respect to the ambient temperature. Thus, regardless of the temperature T in the tire 2, the controller 20 accurately determines that the life of the battery 15 is ending when the discharge level of the battery 15 substantially reaches 80%. That is, in the first embodiment, the judgment regarding the life of the battery 15 is performed based on the discharge level of the battery 15.

Even if the discharge level of the battery 15 reaches 80%, the transmitter 3 does not immediately stop operating. Thus, the driver of the vehicle 1 is notified that the life of the battery 15 is ending before the transmitter 3 actually stops operating.

The voltage reference value V0 is computed in relation to the temperature T of the tire 2 using the equation (1). Since the equation (1) simply represents the linear function, the computing process of the voltage reference value V0 is easy to perform.

If the voltage V has been repeatedly judged to be smaller than the voltage reference value V0 in consecutive judgment cycles, it is determined that the life of the battery 15 is ending. Thus, the determination is highly reliable, as compared to the case in which the determination is based on a single cycle of comparison between the voltage V and the voltage reference value V0.

Alternatively, in step S6, the predetermined number N may be selected to be one. If this is the case, once the voltage V of the battery 15 is judged to be smaller than the voltage reference value V0, it is determined that the life of the battery 15 is ending. However, since the voltage reference value V0 is selected in accordance with the temperature T in the tire 2, the determination is still sufficiently reliable.

Figure 7:
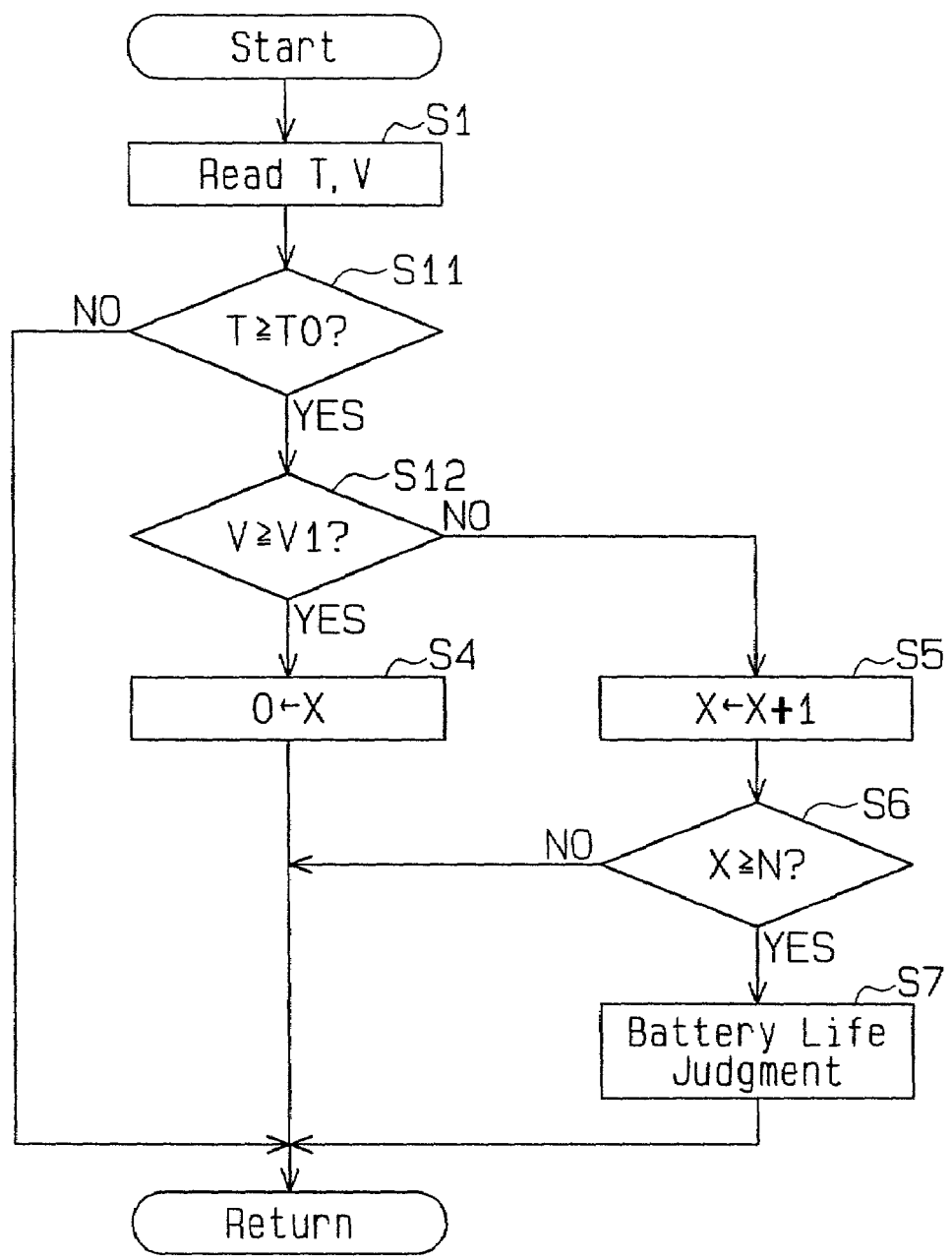
FIG. 7 is a flowchart showing a battery life judging process of a second embodiment according to the present invention.

A second embodiment according to the present invention will hereafter be described with reference to the flowchart of FIG. 7. In the second embodiment, the battery life judging routine of FIG. 7 is performed instead of the routine of FIG. 6. Same or like reference numerals are given to steps in FIG. 7 that are the same as or like corresponding parts in FIG. 6.

When receiving data from one transmitter 3, the controller 20 performs step S1. In step S1, as in the corresponding step of FIG. 6, the controller 20 reads the temperature T in the tire 2 associated with the transmitter 3 and the voltage V of the associated battery 15, from the received data.

Subsequently, in step S11, the controller 20 judges whether or not the temperature T is equal to or greater than a predetermined reference value T0. The reference value T0 is a constant value which is, for example, approximately −30 degrees Celsius. If the temperature T is equal to or greater than the reference value T0, the controller 20 proceeds to step S12 and judges whether or not the life of the battery 15 is ending.

In step S12, the controller 20 judges whether or not the voltage V is equal to or greater than a predetermined voltage reference value V1. The voltage reference value V1 is a constant value, unlike the voltage reference value V0 of the routine of FIG. 6. If the voltage V is equal to or greater than the voltage reference value V1, the controller 20 proceeds to step S4. In contrast, if the voltage V is smaller than the voltage reference value V1, the controller 20 performs step S5.

The procedure of steps S4 to S7 is the same as that of the routine of FIG. 6. That is, if the voltage V is equal to or greater than the voltage reference value V1, it is determined that the life of the battery 15 is not ending yet. However, if the voltage V has been repeatedly judged to be smaller than the voltage reference value V1 in N consecutive judgment cycles, it is determined that the life of the battery 15 is ending.

If the controller 20 determines that the temperature T in the tire 2 is smaller than the reference value T0 in step S11, the controller 20 discontinues the process without performing the judgment regarding the life of the battery 15.

As described, in the second embodiment, the judgment regarding the life of the battery 15 is not performed as long as the temperature T in the tire 2, or the ambient temperature to which the battery 15 is exposed, is smaller than the reference value T0. That is, if the voltage V of the battery 15 is excessively low due to the ambient temperature, the judgment is suspended. This prevents the life of the battery 15 from being erroneously judged to be ending when the temperature in the tire 2 is relatively low.

The reference value T0 and the voltage reference value V1 are constant values, unlike the routine of FIG. 6 in which the voltage reference value V0 is changed in accordance with the temperature T in the tire 2. This simplifies the battery life judging process, and the operation of the controller 20 is also simplified.

Figure 8:
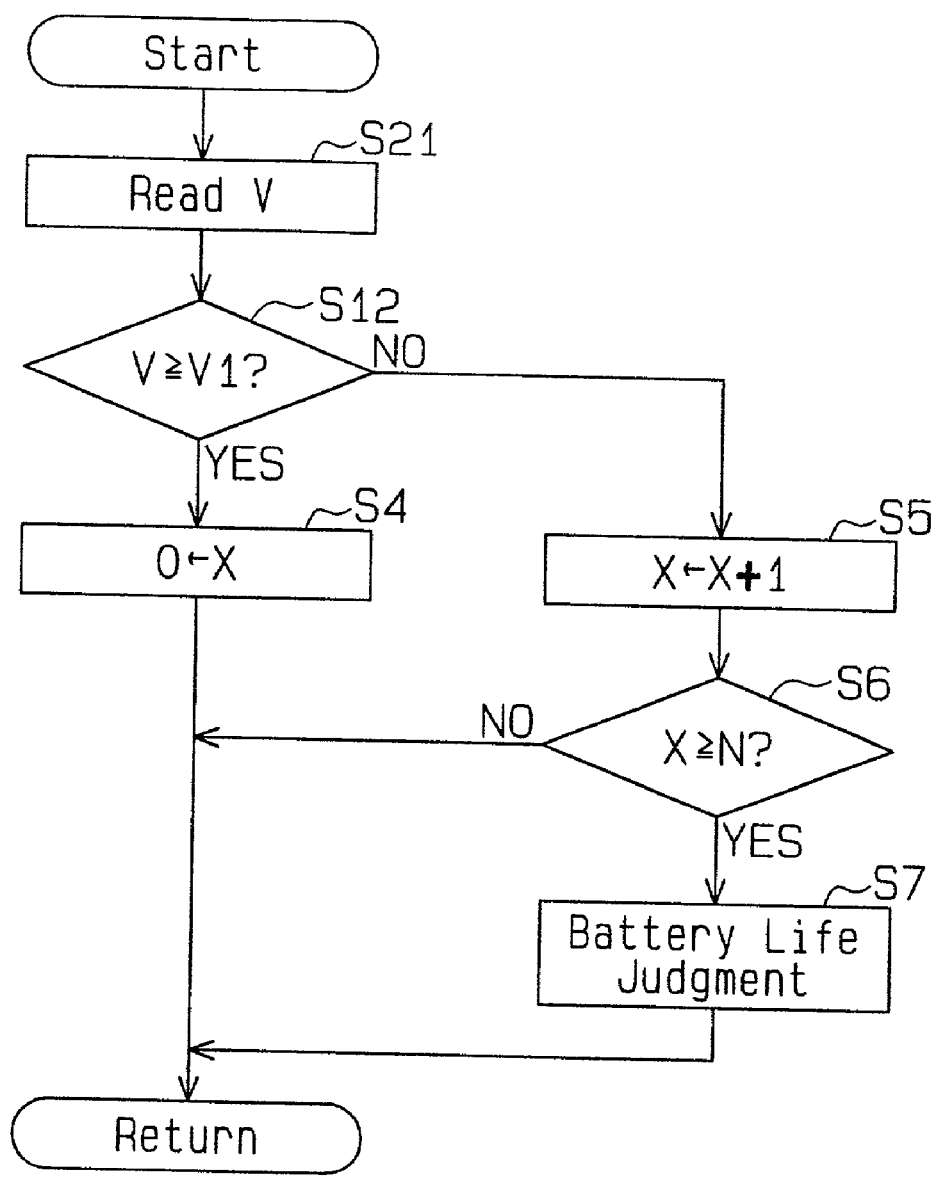
FIG. 8 is a flowchart showing a battery life judging process of a third embodiment according to the present invention.

A third embodiment of the present invention will hereafter be described with reference to the flowchart of FIG. 8. In the third embodiment, the battery life judging process of FIG. 8 is performed, instead of the routine in FIG. 6 or 7. Same or like reference numerals are given to steps in FIG. 8 that are the same as or like corresponding parts in FIG. 6 or 7.

The routine of FIG. 8 is essentially the same as the routine of FIG. 7 except for step S11, which is not performed in the routine of FIG. 8. More specifically, in the routine of FIG. 8, when receiving data from one transmitter 3, the controller 20 performs step S1. That is, the controller 20 reads the voltage V of the battery 15 associated with the transmitter 3 from the received data.

Subsequently, in step S12, the controller 20 judges whether or not the voltage V is equal to or greater than the predetermined voltage reference value V1. As in the routine of FIG. 7, the voltage reference value V1 is a constant value. If the voltage V is equal to or greater than the voltage reference value V1, the controller 20 proceeds to step S4. In contrast, if the voltage V is smaller than the voltage reference value V1, the controller 20 proceeds to step S5.

The procedure of steps S4 to S7 of FIG. 8 is the same as the corresponding procedure of FIG. 6. That is, if the voltage V is equal to or greater than the voltage reference value V1, it is determined that the life of the battery 15 is not ending yet. However, if the voltage V has been repeatedly judged to be smaller than the voltage reference value V1 in consecutive judgment cycles corresponding to the predetermined number N, it is determined that the life of the battery 15 is ending.

As described, in the third embodiment, it is determined that the life of the battery 15 is ending if the voltage V has been repeatedly judged to be smaller than the voltage reference value V1 in the consecutive judgment cycles. Thus, as compared to the case in which the judgment regarding the life of the battery 15 is performed based on a single cycle of comparison between the voltage V and the voltage reference value V1, the judgment is reliable.

In the third embodiment, the judgment regarding the life of the battery 15 is performed regardless of the temperature T in the tire 2. However, even when the atmospheric temperature is relatively low, the temperature T gradually increases if the vehicle 1 is maintained in an operating state.

Thus, as long as the vehicle 1, or the receiver 4, remains in the operating state, the voltage V of the battery 15 starts to increase after a relatively short period of time in which the voltage V of the battery 15 is excessively decreased due to the ambient temperature, unless the life of the battery 15 is actually ending. Accordingly, if the predetermined number N is selected to be a relatively large number, for example, eight to ten, the life of the battery 15 is prevented from being erroneously judged, even if the ambient temperature is relatively low.

The present invention is not restricted to the illustrated embodiments but may be modified as follows.

In the routine of FIG. 6, the voltage reference value V0 does not necessarily have to be determined using the equation (1) as illustrated. That is, the equation (1) may be modified depending on the type or characteristics of the battery 15, which is attached to the transmitter 3.

In the routine of FIG. 6, the voltage reference value V0 may be determined without using the equation (1). For example, a memory of the controller 20 stores data that indicates the curve Vu in the graph of FIG. 4, which represents the voltage variation of the battery 15 in the 80% discharged state. The controller 20 selects the voltage reference value V0 in accordance with the stored data.

In the routines of FIGS. 6 to 8, the predetermined number N may be modified depending on conditions under which the transmitter 3 is used, as long as the predetermined number N is an integer.

In the routine of FIG. 7 or 8, the voltage reference value V1 may be modified depending on the type or characteristics of the battery 15.

In the routine of FIG. 7, the reference value T0 may be modified depending on conditions under which the transmitter 3 is used or the type or characteristics of the battery 15.

Each transmitter 3 does not necessarily have to include the voltage sensor 16, as long as each transmitter 3 has a sensor that measures a value that varies in relation to the voltage V of the battery 15. For example, the transmitter 3 may be provided with a resistance sensor that measures resistance in an electric circuit of the transmitter 3. In this case, the transmitter 3 transmits data that represents the resistance, instead of data that represents the voltage V of the battery 15. The receiver 4 reads the resistance value from the received data and compares the value with a reference value to determine whether or not the life of the battery 15 is ending. The reference value may be varied in accordance with the temperature T in the tire 2 or may be a constant value.

The battery life judging routines of FIGS. 6 to 8 may be performed by the transmitters 3, instead of the receiver 4. In this case, when each transmitter 3 determines that the life of the associated battery 15 is ending, the transmitter 3 informs the receiver 4 of the state of the battery 15.

Therefore, the present examples and embodiments are to be considered as illustrative and not restrictive and the invention is not to be limited to the details given herein, but may be modified within the scope and equivalence of the appended claims.

What is claimed is:

1. A tire condition monitoring apparatus for monitoring a condition of a tire attached to a vehicle, the apparatus comprising:

a transmitter, which is operated by a battery and detects at least a temperature in the tire and a voltage-related value that varies in accordance with a voltage of the battery, wherein the battery has a life; and a controller, which judges whether or not the life of the battery is ending depending on the voltage-related value, wherein the judgment regarding the life of the battery is performed in accordance with a comparison of the voltage-related value that varies in accordance with the voltage of the battery with a voltage-related reference value that is based at least in part on the temperature in the tire.

2. The apparatus as set forth in claim 1, wherein the transmitter wirelessly transmits data, which includes data that represents the temperature in the tire and data that represents the voltage-related value, and the controller is located in a receiver that receives the data from the transmitter.

3. The apparatus as set forth in claim 1, wherein the controller judges whether or not the life of the battery is ending based on a comparison between the voltage-related value and a variable voltage reference value that is selected in accordance with the temperature in the tire.

4. The apparatus as set forth in claim 3, wherein the controller determines the voltage reference value using a functional equation that represents variation of the voltage of the battery with respect to the ambient temperature to which the battery is exposed.

5. The apparatus as set forth in claim 3, wherein the controller determines that the life of the battery is ending if the voltage-related value has been repeatedly judged to be smaller than the voltage reference value in consecutive judgment cycles.

6. The apparatus as set forth in claim 1, wherein the controller judges whether or not the life of the battery is ending based on a comparison between the voltage-related value and a predetermined constant voltage reference value if the temperature in the tire is equal to or greater than a predetermined reference value, and the controller does not perform the judgment regarding the life of the battery if the temperature in the tire is smaller than the reference value.

7. The apparatus as set forth in claim 5, wherein the controller determines that the life of the battery is ending if the voltage-related value has been repeatedly judged to be smaller than the voltage reference value I consecutive judgment cycles.

8. The apparatus as set forth in claim 1, wherein the voltage-related value is the voltage of the battery or a resistance in an electric circuit of the transmitter.

9. A tire condition monitoring apparatus for monitoring a condition of a tire attached to a vehicle, the apparatus comprising:

a transmitter, which is operated by a battery and wirelessly transmits data, wherein the data includes at least data that represents a temperature in the tire and data that represents a voltage of the battery, wherein the battery has a life; and a receiver, which receives the data from the transmitter, wherein the receiver includes a controller that judges whether or not the life of the battery is ending depending on the voltage of the battery, which is derived from the received data, wherein the judgment regarding the life of the battery is performed in accordance with a comparison of the voltage of the battery with a voltage-related reference value that is based at least in part on the temperature in the tire, which is derived from the received data.

10. The apparatus as set forth in claim 9, wherein the controller judges whether or not the life of the battery is ending based on a comparison between the voltage of the battery and a variable voltage reference value that is selected in accordance with the temperature in the tire.

11. The apparatus as set forth in claim 10, wherein the controller determines the voltage reference value using a functional equation that represents variation of the voltage of the battery with respect to the ambient temperature to which the battery is exposed.

12. The apparatus as set forth in claim 9, wherein the controller judges whether or not the life of the battery is ending based on a comparison between the voltage of the battery and a predetermined, constant voltage reference value if the temperature in the tire is equal to or greater than a predetermined reference value, and the controller does not perform the judgment regarding the life of the battery if the temperature in the tire is smaller than the reference value.

13. The apparatus as set forth in claim 10, wherein the controller determines that the life of the battery is ending if the voltage of the battery has been repeatedly judged to be smaller than the voltage reference value in consecutive judgment cycles.

14. The apparatus as set froth in claim 12, wherein the controller determines that the life of the battery is ending if the voltage of the battery has been repeatedly judged to be smaller than the voltage reference value in consecutive judgment cycles.

15. A tire condition monitoring apparatus for monitoring a condition of a tire attached to a vehicle, the apparatus comprising:

a transmitter, which is operated by a battery, the battery having a life, wherein the transmitter includes:

a temperature sensor, which detects a temperature in the tire;

a voltage sensor, which detects a voltage of the battery; and a transmitting circuit, which wirelessly transmits data including data that represents the detected temperature and data that represents the detected voltage; and a receiver, which receives the data from the transmitter, wherein the receiver includes a controller that judges whether or not the life of the battery is ending based on a comparison between the voltage of the battery, which is derived from the received data, and a variable voltage reference value that is selected in accordance with the temperature in the tire, which is derived from the received data.

* * * * *